W. R. STURGISS.
CULTIVATOR ATTACHMENT.
APPLICATION FILED MAR. 7, 1914.
1,107,864.
Patented Aug. 18, 1914.
2 SHEETS—SHEET 1.
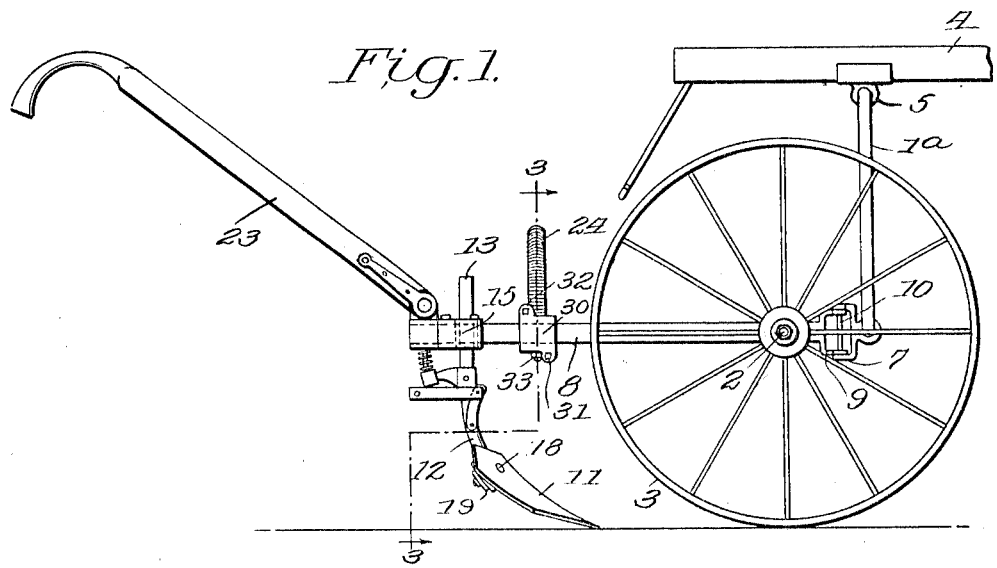
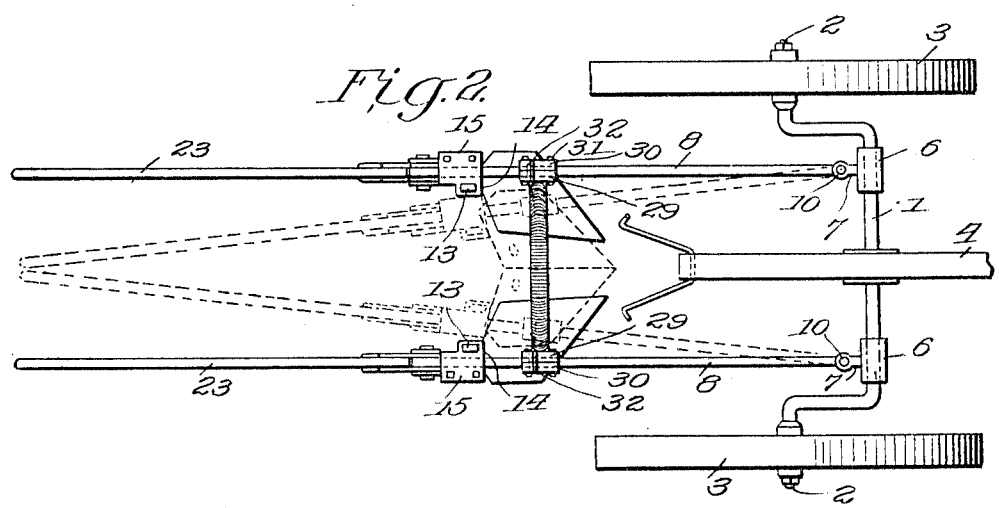
WITNESSES
Samuel E. Wade
C. E. Tremor
INVENTOR
Wilbur R. Sturgiss
BY Munn & Co.
ATTORNEYS W. R. STURGISS.
CULTIVATOR ATTACHMENT.
APPLICATION FILED MAR. 7, 1914.
1,107,864.
Patented Aug. 18, 1914.
2 SHEETS—SHEET 2.
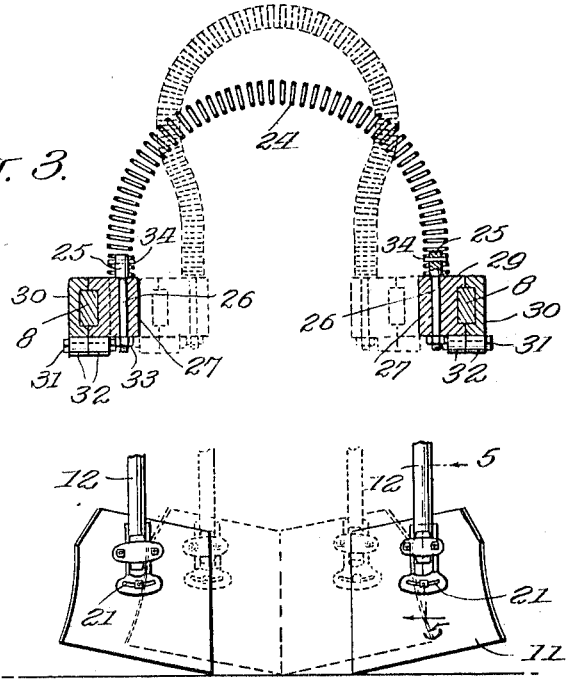
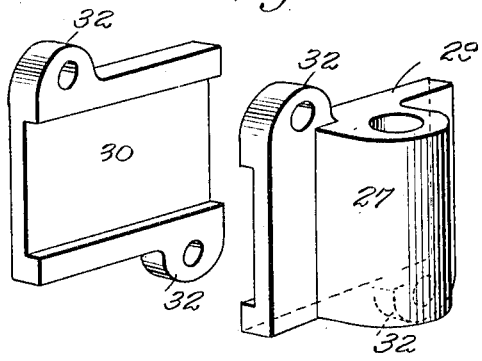
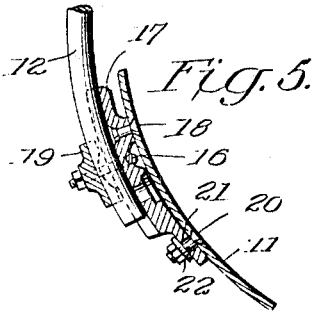
WITNESSES
INVENTOR
Wilbur R. Sturgiss
BY
ATTORNEYS

UNITED STATES PATENT OFFICE.

WILBUR REEDER STURGISS, OF CONWAY, ARKANSAS, ASSIGNOR OF ONE-HALF TO RALPH D. WHITE, OF CONWAY, ARKANSAS.

CULTIVATOR ATTACHMENT.

1,107,864.   Specification of Letters Patent.   Patented Aug. 18, 1914.

Application filed March 7, 1914. Serial No. 823,168.

*To all whom it may concern:*

Be it known that I, WILBUR R. STURGISS, a citizen of the United States, and a resident of Conway, in the county of Faulkner and State of Arkansas, have invented a new and useful Improvement in Cultivator Attachments, of which the following is a specification.

My invention is an improvement in cultivator attachments, and has for its object to provide an attachment of the character specified, adapted for attachment to any cultivator, either walking or riding, and wherein thinning mechanism is provided, consisting of two blades, and wherein the blades are so mounted that they may move toward and from each other, and wherein mechanism is provided for normally pressing the blades together to permit them to move together while thinning the row, and wherein mechanism is provided, under the control of the operator, for moving the blades apart to permit certain of the plants to remain in the row, the blades passing on opposite sides of the row when separated.

In the drawings:—Figure 1 is a side view of the improvement attached to a cultivator, Fig. 2 is a top plan view of Fig. 1, Fig. 3 is a section on the line 3—3 of Fig. 1, looking in the direction of the arrows, Fig. 4 is a perspective view of the sectional clamp, and Fig. 5 is a section on the line 5—5 of Fig. 3, looking in the direction of the arrows adjacent to the line.

The present embodiment of the invention is shown in connection with a cultivator, consisting of an arched axle, comprising a body 1 and spindles 2, which are offset laterally and rearwardly from the body, and wheels 3 are journaled upon the spindles. The body is also provided with an upward extension 1ª, to which a tongue 4 is connected, by means of a bearing 5, and sleeves 6 are arranged on the body of the axle on each side of the tongue, for permitting the cultivating mechanism to be connected to the axle. Each sleeve is provided with vertically spaced laterally extending bearing lugs 7, and beams 8 are connected with the lugs, each beam having similarly spaced bearing lugs 9 received between the lugs 7 of the adjacent sleeve and pivoted thereto by means of a bolt 10, or the like. The cultivating blades 11 of trapezoidal shape are supported by the beams, each blade being secured to the lower end of a standard 12. The blades as shown, are concavo-convex, and are arranged with their concave faces forwardly and upwardly. Two side edges of each blade meet at an acute angle to form a cutting point, and the adjacent edges of the blades are straight, and they are adapted to contact under conditions to be later described, to form a thinning plow, for turning the soil in both directions to uproot and destroy the plants in question. Each of the standards 12 is provided at its upper end with a portion 13, rectangular in cross section, and the said portion of each standard passes through a similarly shaped opening in a lug 14, extending laterally from a sectional block 15, which is mounted to slide on the adjacent beam. The blades are connected to the standards as shown in Fig. 5, by means of a substantially U-shaped clip 16.

One of the sections 17 of a bearing is secured to the rear convex face of each blade by means of rivets 18 or the like, and the said section engages the front face of the adjacent standard. The other section 19 of the bearing engages the rear face of the standard, and the sections are clamped together on the standards, by means of the U-shaped clip. The bearing 17 is adjustably connected to the blade, by means of the rivet 18 before mentioned, and a bolt 20. The blade is mounted to swing on the rivet 18, and the bolt passes through an opening in the blade and through an arc-shaped slot 21 in the bearing section, and is engaged by a nut 22 on the rear face of the bearing section. The said section extends below the lower end of the post and it will be obvious that when the nut 22 is loosened the lower end of the blade may be swung in either direction with respect to the post.

Handles 23 are provided for controlling the movement of the beams, the said handles being secured to the rear ends of the beams, as shown. A coil spring 24 is arranged between the beams at the blades, the said spring being of arc-shape as shown, and having one end connected to each beam. Each end of the spring fits over a head 25 on a bolt 26, which is passed through an inwardly extending lug 27 on one of the sections 29 of a sectional bearing block mounted on the adjacent beam. The section 29 of each bearing block is mounted on the inner side of each beam, and the other section 30 of each block is mounted on the outer side. The sections are held together by means of a bolt and nut 31, the bolt passing through depending lugs 32 on the sections and being engaged by the nut to clamp the sections on the beam. The lower ends of the bolts 26 are engaged by nuts 33, and a pin 34 is passed through each head 25 for engagement by the adjacent end of the spring. The spring tends to take the shape indicated in dotted lines in Fig. 3, and when in this position the beams and the handles will occupy the dotted line position of Fig. 2, and the blades will take the position shown in dotted lines in Figs. 2 and 4, that is, with their adjacent edges in contact. When so arranged, the blades constitute a plow which will throw the soil in both directions.

The operation of the device is as follows:— The cultivator is drawn astride the row with the blades, the handles and the beams in the dotted line position of Fig. 2. The blades follow up the row, throwing the soil in both directions and uprooting or cutting off the plants. Whenever it is desired to leave a plant or plants standing the operator separates the handles into the full line position of Fig. 2, thus separating the blades, which now travel at the sides of the row, so that they do not disturb the plants which it is desired to leave in the row.

I claim:—

1. A device of the character specified, comprising in combination with a wheel supported cultivator frame, of beams pivoted to the frame at their front ends to swing laterally on vertical axes, a handle connected to the rear of each beam, a standard adjustably connected with each beam, a blade supported by each standard at the lower end thereof, resilient means engaging the beams for pressing them toward each other, said blades being adapted to abut at their inner edges, and each blade inclining rearwardly and outwardly when so abutted to form a plow for moving the soil in both directions, and adapted to be separated by means of the handles.

2. A device of the character specified, comprising a wheel supported frame, beams pivoted to the frame at their front ends and mounted to swing laterally toward and from each other, normally active means for pressing the rear ends of the beams together, a blade supported below each beam and adjustable with respect to the beam, said blades being adapted to abut at their inner edges when the beams are pressed together to form a turning plow for throwing the soil in both directions from the abutting edges of the blade.

3. In a device of the character specified, cultivating blades adapted to abut at their inner edges to form a turning plow for throwing the soil in opposite directions from the abutting edges of the blades, means for supporting the blades for movement toward and from each other, and resilient means normally acting to move the blades apart, said last named means comprising a coil spring, and a support for each blade, the spring being arched and having its ends connected with the adjacent supports.

WILBUR REEDER STURGISS.

Witnesses:
E. W. GARDNER,
R. D. WHITE.